United States Patent [19]

Kelleher, Jr. et al.

[11] Patent Number: 5,014,176
[45] Date of Patent: May 7, 1991

[54] SWITCHING CONVERTER WITH SPIKE LIMITING CIRCUIT

[75] Inventors: John J. Kelleher, Jr., Peabody; Donald W. Shute, Burlington, both of Mass.

[73] Assignee: Raytheon Company, Lexington, Mass.

[21] Appl. No.: 312,797

[22] Filed: Feb. 21, 1989

[51] Int. Cl.[5] .......................................... H02M 3/337
[52] U.S. Cl. ....................................... 363/26; 363/56; 363/134
[58] Field of Search .................................. 363/24-26, 363/56, 134

[56] References Cited

U.S. PATENT DOCUMENTS

| | | | |
|---|---|---|---|
| 4,336,587 | 6/1982 | Boettcher et al. | 363/24 |
| 4,438,486 | 3/1984 | Ferraro | 363/56 |
| 4,564,896 | 1/1986 | Akerson | 363/26 |
| 4,665,475 | 5/1987 | Brandstatter | 363/26 |

FOREIGN PATENT DOCUMENTS

| | | | |
|---|---|---|---|
| 1956145 | 5/1971 | Fed. Rep. of Germany | 363/56 |
| 25175 | 2/1982 | Japan | 363/56 |
| 873361 | 10/1981 | U.S.S.R. | 363/134 |
| 1347138 | 10/1987 | U.S.S.R. | |

OTHER PUBLICATIONS

DC-DC Converter Circuit described and shown in Information Disclosure Statement dated Feb. 16, 1989.
"Pulse and Digital Circuits" Millman and Taub, McGraw-Hill Book Company, Inc., 1956, pp. 248 (Section 8-6) through 252 (note particularly FIG. 8-19).
"Silicon General Product Catalog" (1986), note particularly 94-101 and pp. 160-166.
V. Joseph Thottuvelil et al., "Small-Signal Modeling of a Push-Pull Current-Fed Converter", IEEE Power Electronics Specialists Conf., also known as "PESC '82 Record" (Jun. 14-17, 1982), pp. 224-239.

Primary Examiner—William H. Beha, Jr.
Attorney, Agent, or Firm—Denis G. Maloney; Richard M. Sharkansky

[57] ABSTRACT

A switching circuit which provides excess voltage and a circuit, responsive to the excess voltage, to direct energy related to the excess voltage back to a voltage source coupled to the switching circuit is described. The circuit responsive to the excess voltage includes a capacitor, an inductor, and a transistor to couple and decouple the capacitor and the inductor. The transistor couples the capacitor to the inductor to transfer energy related to excess voltage stored in the capacitor to the inductor for storage, and decouples the capacitor from the inductor to transfer energy stored in the inductor to the voltage source. The circuit also includes a comparator, responsive to the level of the excess voltage, to provide a control signal to the transistor to control the coupling and decoupling of the capacitor and the inductor.

10 Claims, 4 Drawing Sheets

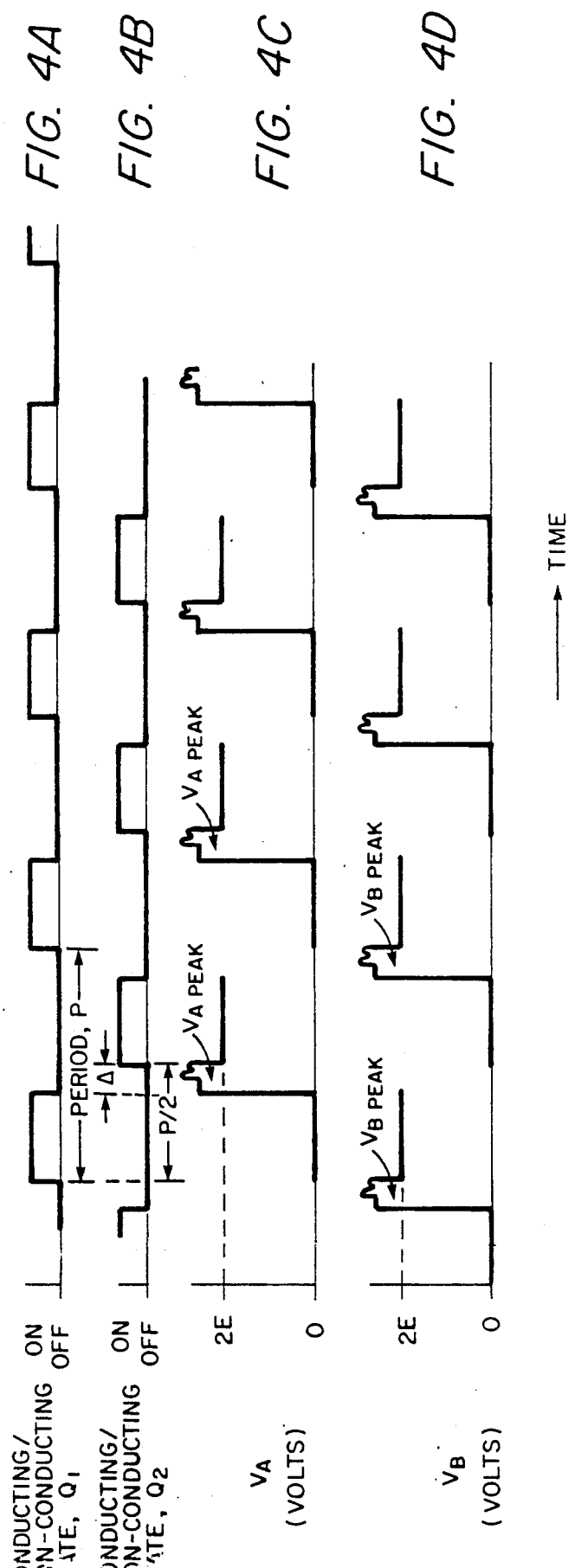

5,014,176

SWITCHING CONVERTER WITH SPIKE LIMITING CIRCUIT

BACKGROUND OF INVENTION

This invention relates generally to switching circuitry and more particularly to switching circuitry that inherently produces undesirable energy spikes.

As is known in the art, switching circuitry is used in a wide variety of applications. One such application is in a DC-DC converter power supply. Here the level of a DC voltage is converted to a different DC voltage level by a switching regulator. More specifically, a DC voltage source is periodically coupled to the upper and lower, inductively coupled primary windings of a center tapped output transformer. In particular, during a portion of the first half of each cycle the DC voltage source is electrically de-coupled from the lower winding and is electrically coupled to the upper winding and during a portion of the second half of each cycle the DC voltage source is electrically de-coupled from the upper winding and is electrically coupled to the lower winding. The secondary of the transformer is coupled to a load, typically a resistor and parallel connected filtering capacitor and inductor, via a diode rectifying bridge network. The time duration which the DC voltage source is coupled to the primary winding in each cycle and the time duration during which the DC voltage source is coupled to the lower winding (i.e. the duty cycles of the voltages coupled to the upper and lower windings) is related to the difference between the average level of the DC voltage produced across the load resistor and the desired DC output voltage. In the steady state then, the average DC output voltage will be equal to the desired DC output voltage. One such DC-DC converter is shown in FIG. 1. A DC voltage source, $V_s$, here a battery 10 and a capacitor $C_1$ connected in shunt therewith, produces an output voltage E on line 11. The positive (+) potential of this DC produced voltage is coupled, via line 11, to the input of a switching regulator 12. More particularly, the produced voltage is alternatively coupled between the center tap (CT) and lower end A of lower winding $L_1$ and between the center tap (CT) and upper end B of upper winding $L_2$. That is, when switch $S_1$ is closed by controller 14 and switch $S_2$ is opened by such controller 14, the produced voltage E is coupled across lower winding $L_1$. Because of the inductive coupling between an upper primary winding $L_2$ and the lower primary winding $L_1$ with the winding polarity indicated by the dots ( • ), a voltage 2E is induced across the entire primary winding, with the voltage 2E being more positive at the upper end B of upper winding $L_2$ than the lower end A of lower winding $L_1$. Likewise, during the time the voltage source $V_s$ is coupled to the upper winding $L_2$ switch $S_2$ is closed and switch $S_1$ is opened by the controller 14. The effect then is to induce a voltage 2E across the entire primary winding; the polarity of such voltage, however, now being reversed; that is, the voltage at the upper end B of upper winding $L_2$ is now more negative than the voltage at the lower end A of the lower winding $L_1$. It should be noted, however, that the voltage source $V_s$ is coupled to either the lower winding $L_1$ or the upper winding $L_2$ with a duty cycle less than 50%. Thus, during a portion of each cycle, the voltage source $V_s$ will be electrically de-coupled from both the lower and upper primary windings $L_1$, $L_2$. During these portions of each cycle, energy stored in stray inductances, such as leakage inductance of the primary and stray inductances of the circuit wiring, will induce voltage spikes at ends A and B. If not limited in magnitude, such voltage spike can destroy the switches $S_1$, $S_2$, which are transistors (either bipolar or field effect here, bipolar transistors). Here, however, a voltage spike limiter 15 is provided. Such voltage spike limiter 15 is coupled to the upper and lower ends B, A of the primary winding $L_1$, $L_2$ of transformer T. The voltage spike limiter 15 includes a capacitor $C_2$ and Zener diode $D_z$, coupled in parallel with each other, and in series with the upper and lower ends, B, A, of the upper and lower windings $L_2$, $L_1$ respectively, through diodes $D_2$, $D_1$, respectively, as shown. Considering, for example, the response of the circuit when switch $S_2$ opens. The spike voltage at the upper end B of the upper winding $L_2$ will forward bias diode $D_2$ and such spike voltage will rapidly charge capacitor $C_2$ which provides a low impedance to the transient spike voltage. The voltage on the upper end B of the upper winding $L_2$ will be clamped to an acceptable voltage level by the Zener diode $D_z$. An acceptable voltage level would be a voltage level which would not destroy switch $S_1$. Alternatively, when switch $S_1$ is opened, the voltage spike at a lower end A forward biases diode $D_1$, and the voltage spike passing through voltage diode $D_1$ will charge capacitor $C_2$ and will likewise be clamped in voltage level by the Zener diode $D_z$. The clamped voltage must be greater than 2E but less than the transistor breakdown voltage of switches $S_1$, $S_2$. Normally, the power contained in the energy spike can be dissipated in the Zener diode $D_z$ or some other devices serving a similar function.

Completing the circuit, the secondary $L_S$ of the transformer T is coupled to a load resistor $R_L$ through inductor $L_F$ and parallel connected filtering capacitor $C_F$ via a diode bridge rectifying circuit 16, as shown. With the polarity of the secondary and primary indicated by the dots ( • ), the diode bridge rectifying circuit 16 thus produces a current $I_L$ having the same directions of flow, as indicated by the arrow 19, during both the first and second halves of each cycle. A voltage divider network 18 is provided, as shown, to produce a control voltage in response to a portion of the circuit $I_L$ for the controller 14 in a connectional manner as described above so that, in the steady state, the output voltage $E_o$ will be equal to the desired output voltage.

Spike power dissipation in a medium power DC-DC converter (100-150W) at a 20 kilohertz switching frequency can be calculated by assuming one microhenry of equivalent leakage and stray inductance and one ampere of primary current with E=150 V. Spikes occur at twice the switching frequency, F. Therefore, power loss from the spikes will be 20 milliwatts (i.e. $2(\frac{1}{2})LI^2(20,000)$ where L is the leakage and stray inductance and I is the primary current). However, consider a 4 kilowatt power supply switching at 100 kilohertz with a primary current of 40 amperes. Here the power loss will be $2(\frac{1}{2})(1 \times 10^{-6} \times 40^2) 100K = 160$ watts. (Note that power is proportional to $I^2$ and frequency, F). It follows then that as the power of the converter increases, and/or the switching frequency increases, a significant amount of lost power from the spike energy results.

SUMMARY OF THE INVENTION

In accordance with the present invention, a switching circuit comprises: an input voltage source means for producing a DC voltage; a transformer having a pair of inductively coupled primary windings; means for electrically coupling the produced DC voltage across a first one of the pair of windings during a first portion of a cycle to induce a voltage in a second one of the pair of windings during such first portion of the cycle and for electrically coupling the produced DC voltage across the second one of the pair of windings during a second, subsequent portion of the cycle to induce the voltage in the first one of the pair of windings during the second portion of the cycle; and means, responsive to a level of the voltages induced in the pair of windings exceeding a predetermined voltage, for directing energy related to the excessive voltages back to the voltage source means.

With such arrangement, undesirable energy spikes produced in the primary windings from stray and/or leakage inductances is returned to the voltage source means for subsequent use by the voltage source means.

BRIEF DESCRIPTION OF THE DRAWINGS

For more complete understanding of the concepts of this invention, references now made to the following description taken together in conjunction with the accompanying drawings in which:

FIG. 4A-4D are timing diagrams useful in understanding the DC-DC converter of FIG. 2.

DESCRIPTION OF THE PREFERRED EMBODIMENT

Figure 1:
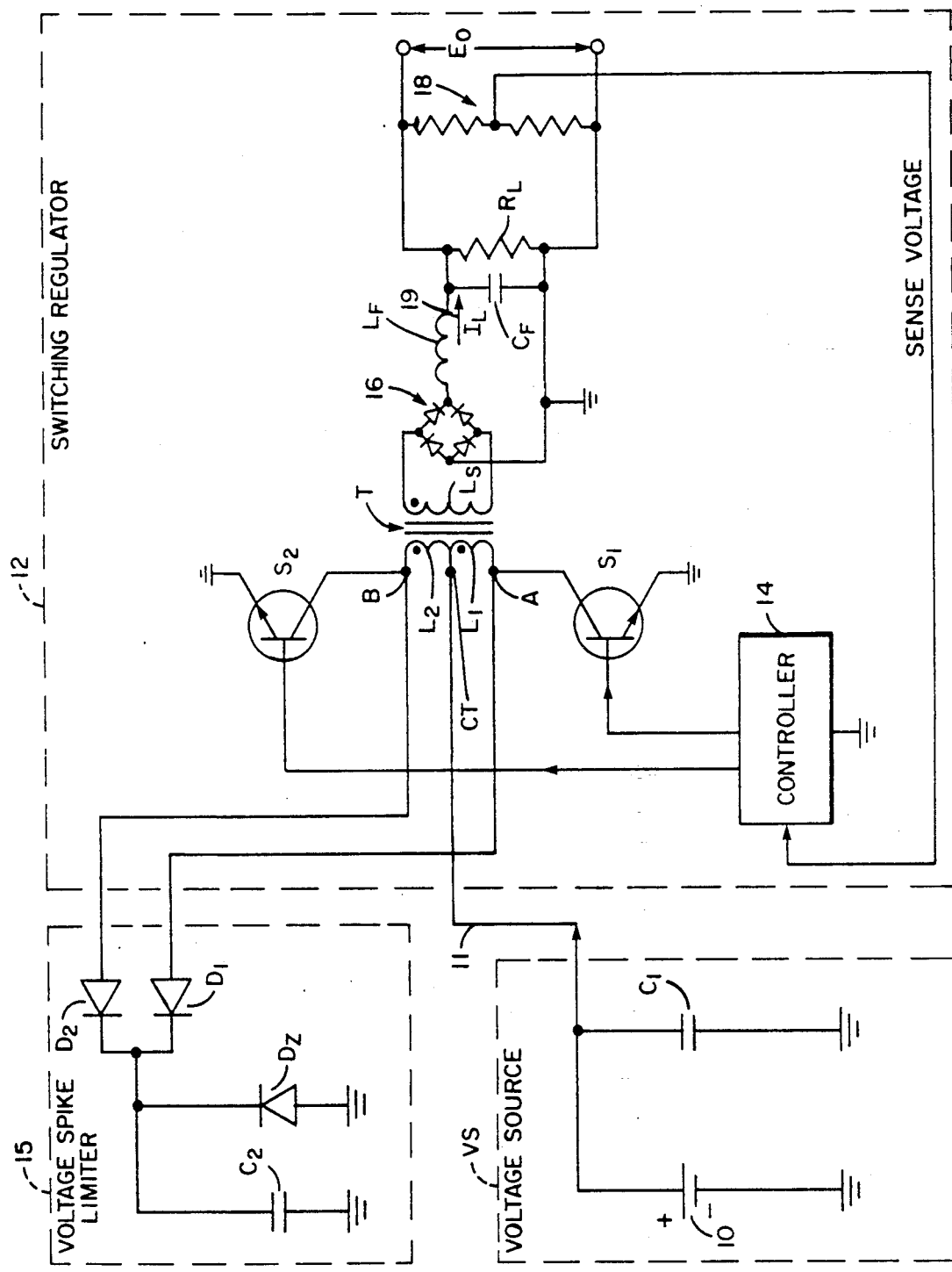
FIG. 1 is a schematic diagram of a DC-DC converter according to the prior art which has been described above.
Figure 2:
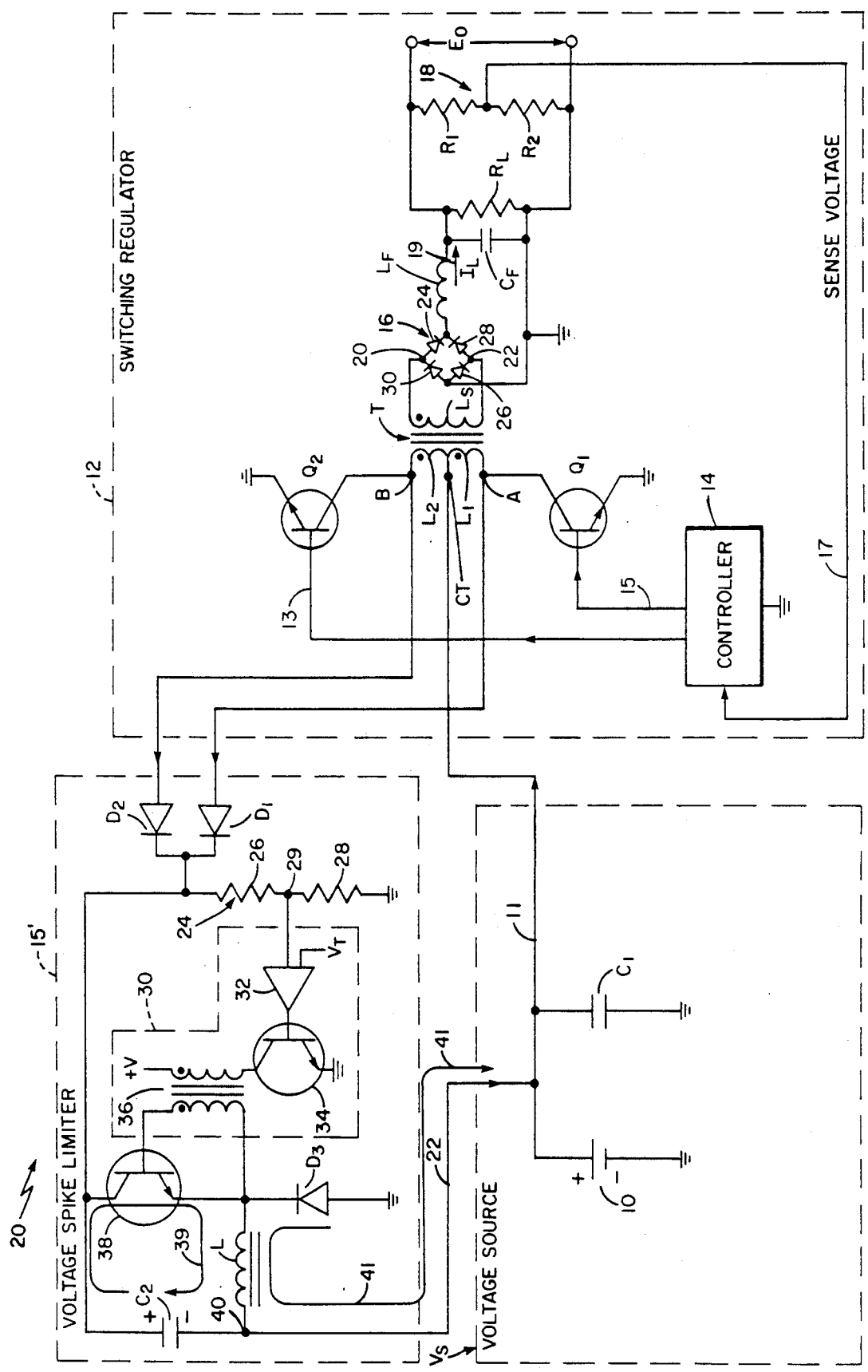
FIG. 2 is a schematic diagram of a DC-DC converter according to the invention.

Referring now to FIG. 2, a DC-DC converter 20 is shown to include a voltage source $V_s$, here a battery 10 coupled and parallel to capacitor $C_1$, to produce a DC voltage, such voltage being fed, via line 11, to the input of a switching regulator 12, such switching regulator 12 being of the type described above in FIG. 1. More particularly, the voltage produced by the voltage source $V_s$ is fed to the collector electrodes of a pair of switching transistors $Q_1$, $Q_2$ (here functioning as switches $S_1$, $S_2$ described in connection with FIG. 1) through the primary winding of center tapped step-up transformer T. The emitter electrode of NPN transistor $Q_1$ and the emitter of electrode of NPN transistor $Q_2$ are grounded, as shown. The base electrodes of transistors $Q_1$ and $Q_2$ are fed by a controller 14 via lines 15, 13, respectively as shown. The controller 14 may be any conventional regulating pulse width modulator, here model SG1526 manufactured by Silicon General Integrated Circuits, Inc., Westminster, California. The secondary winding $L_s$ of transformer T is coupled to a resistive load $R_L$ through the diode bridge rectifying network 16. A filtering capacitor $C_F$ and inductor $L_F$ are coupled to the resistive load $R_L$, as shown. A voltage divided network 18 comprising serially coupling resistors $R_1$, $R_2$ is connected in shunt with the resistive load $R_L$ and is used to provide a sense voltage on line 17 for the controller 14. The relative winding polarities of the upper primary winding $L_2$, lower primary winding $L_1$ and secondary winding $L_s$ are indicated in a conventional manner by the dots ( • ). A train of positive going pulses is fed to the base electrode of transistor $Q_1$ by controller 14 via line 15. In response to positive going pulses fed to the base of transistor $Q_1$, such transistor $Q_1$ is driven from a non-conducting condition to a conducting condition, as shown in FIG. 4A. Similarly, a train of positive going pulses is fed to the base of transistor $Q_2$ by controller 14 via line 13, as shown in FIG. 4B. Again, in response to positive going pulses in such train of pulses, transistor $Q_2$ is driven from a non-conducting condition to a conducting condition, as shown in FIG. 4B. The pulse train fed to the base of transistor $Q_1$ (FIG. 4A) has a period P and a duty cycle less than 50 percent. Likewise, the pulse train fed to the base of transistor $Q_2$ FIG. 4B) has a duty cycle less than 50 percent but is delayed one half period (P/2) from the pulse train fed to the base of transistor $Q_1$. Thus, during a portion, $\Delta$, of each period P, there is a dead zone during which both transistors $Q_1$ and $Q_2$ are in non-conducting condition. Further, positive going pulses are produced during a portion of the first half of each cycle, or period P, for transistor $Q_1$ while positive going pulses for transistor $Q_2$ are produced during a portion of the second half of such cycle. When transistor $Q_1$ is driven to a conducting condition, current flows from the voltage source $V_s$, via line 11, through the lower winding $L_1$ of the primary of transformer T to ground via the now conducting transistor $Q_1$. With the upper winding $L_2$ and lower winding $L_1$ having an equal number of turns and with the windings having the polarity indicated by the dots, a voltage substantially equal to E will be produced between the center tap CT and the lower end A of lower winding $L_1$. Further, a voltage substantially equal to E will be induced between the center tap CT and the upper end B of upper winding $L_2$. Thus, a voltage $V_A$ (FIG. 4C), substantially equal to 2E, will be produced between lower end A of lower winding $L_1$ and upper end B of upper winding $L_2$. Further, the voltage at winding end B will be more positive than the voltage at winding end A. In addition, a voltage is induced in the secondary winding $L_s$ of transformer T, such that terminal 20 of diode bridge network 16 will be at a relative positive potential as compared to terminal 22 of such bridge network 16. Thus, diodes 24 and 26 are forward biased with the result that current flows as a result of the induced voltage (EMF) and the secondary $L_s$ of transformer T through forward biased diode 24 through inductor $L_F$, resistor $R_L$ and forward biased diode 26 to produce an output current $I_L$ in the direction indicated by the arrow 19. Correspondingly, each time transistor $Q_2$ is driven from a non-conducting condition to a conducting condition in response to the positive going pulses applied by the controller 14 via line 13, current flows from the voltage source $V_s$ through the upper winding $L_2$ of the primary of transformer T through transistor $Q_2$ to ground. A voltage is induced in the lower end A of lower winding $L_1$ of such transformer to produce a voltage $V_B$ (FIG. 4D) substantially equal to 2E between ends A, B of the primary of transformer T; here, however, the voltage at end A will be more positive than the voltage at terminal B. Like also, a voltage is induced in the secondary $L_s$ of transformer T such that terminal 22 is now at a positive potential relative to the potential at terminal 20. The diodes 28 and 30 are forward biased so that induced voltage produces a current flow from terminal 22 through diode 28 through inductor $L_F$, load $R_L$ through diode 30 to terminal 20. Therefore, during the second half of the period, current $I_L$ passes in the direction indicated by the arrow 19. It is noted that the current $I_L$ is in the same direction as in the first half of the period. Capacitor $C_F$ and inductor $L_F$ provides filtering of these pulses of current $I_L$ to produce a more steady flow of current through resistor $R_L$. The duty cycle of the train of pulses produced by the controller 14 and which are fed to the base of electrodes of transistors $Q_1$ and $Q_2$, is determined by the sense voltage produced on line 17. Once a steady state condition is reached, the voltage produced across load resistor $R_L$, i.e. the voltage $E_o$, will have the desired DC voltage level.

As mentioned above in connection with FIG. 1 and FIGS. 4A and 4B, during each cycle (i.e. during the dead zone $\Delta$) the voltage source $V_s$ will be electrically decoupled from both the upper and lower primary windings $L_1$, $L_2$. During these portions (i.e. dead zone $\Delta$) of each cycles, energy is stored in stray inductances, such as leakage inductance of the primary and stray inductance of the circuit wiring. Thus, when transistor $Q_2$ is off and when transistor $Q_1$ goes from a conducting condition to a non-conducting condition, a voltage $V_{A\ PEAK}$ (FIG. 4C) is induced at the lower end A of the lower winding $L_1$ which will tend to overshoot the desired level of substantially 2E as shown in FIG. 4C, and an undesirable energy, or voltage spike will be produced across such primary winding. Likewise, when transistor $Q_1$ is off and transistor $Q_2$ goes from a conducting condition to a non-conducting condition, a voltage $V_{B\ PEAK}$ (FIG. 4D) is induced at the upper end B of the upper winding $L_1$ which will tend to overshoot the desired level of substantially 2E, as shown in FIG. 4D. Thus, a voltage spike limiter 15' is provided. The voltage spike limiter 15' is fed by the voltage across the upper end B and lower end A of the transformer T. It is noted, however, that an output current is provided on line 22 (FIG. 2) to feed a portion of energy in the spike voltage back to the voltage source $V_s$ in a manner to be described. Suffice it to say here, however, that voltage spike limiter 15' includes diodes $D_1$, $D_2$ coupled to ends A, B respectively of primary windings $L_1$, $L_2$ as shown. The outputs of diodes $D_1$, $D_2$ are connected to capacitor $C_2$ as shown, and to ground through a voltage divider 24 made up of serially connected resistors 26, 28. The terminal 29 located between resistors 26, 28 is fed to a controller 30. Controller 30 includes a comparator 32 having an input connected to terminal 29 and a threshold voltage $V_T$. The output of comparator 32 is fed to the base of grounded emitter NPN transistor 34, the collector of such transistor being coupled to a voltage $+V$ through the primary of a pulse transformer 36. The secondary of such pulse transformer 36 provides the output for the controller 30 and is connected to the base and emitter of transistor 38. An inductor L is connected with capacitor $C_2$ to form a series circuit between the emitter of transistor 38 and the collector of such transistor. A diode $D_3$ is connected, as shown, between the emitter of transistor 38 and ground. A terminal 40, connecting inductor L and capacitor $C_2$, is connected to line 22. In operation, when there is a voltage spike $V_{A\ PEAK}$ (FIG. 4C) or $V_{B\ PEAK}$ (FIG. 4D) at end A or end B respectively, the energy contained in the spikes will cause the voltage across capacitor $C_2$ to increase, and also the voltage across voltage divider 24 to increase. When the voltage at terminal 29 increases above the voltage $V_T$, comparator 32 produces a high voltage driving transistor 34 to a conducting condition initiating a current pulse through the primary of transformer 36. Such current pulse induces a positive going output voltage on the secondary winding of transformer 36 driving transistor 38 to a conducting condition. When transistor 38 is placed in this conducting condition, diode $D_3$ is reversed biased and a series resonant circuit loop, indicated by arrow 39, is formed, such loop 39 passing through capacitor $C_2$, inductor L, and the collector and emitter electrodes of transistor 38 with the result that voltage stored on capacitor $C_2$ decays and transfers energy to the inductor L. The resonant frequency, fr, associated with inductor L and serially connected capacitor $C_2$ is $1/(2\pi\sqrt{LC_2})$. When the voltage at the input to the voltage divider 24 returns to the level 2E, the voltage at terminal 29 falls below the voltage $V_T$ with the result that comparator 32 places transistor 34 in a non-conducting condition. The pulse of current through the primary of transformer 36 thus terminates and thus the current pulse produced in the secondary of such transformer 36 terminates, thereby placing transistor 38 in a non-conducting condition. It should be noted that the time duration during which transistor 38 is in a conducting condition is less than one-half the resonant frequency, fr, of the series resonant circuit of inductor L and capacitor $C_2$. When transistor 38 is placed in this non-conducting condition, the inductor L and capacitor $C_2$ become electrically disconnected from the previous serial connection i.e. the loop indicated by arrow 39 is "opened", and energy stored in inductor L as a result of current passing from capacitor $C_2$ to inductor L when transistor 38 was conducting produces a back EMF across the ends of the winding of inductor L. The produced back EMF forward biases diode $D_3$ and acts as a voltage source causing a current to flow from ground through now forward biased diode $D_3$ through inductor L and into the voltage source $V_s$ via line 22. (Thus, an electrical circuit indicated by arrow 41 is formed). This current, which in effect is generated by spike voltage at the ends of the primary windings of transformer T and initially stored in capacitor $C_2$ and subsequently transferred for storage in inductor L, thus is recaptured and is used to increase the charge on capacitor $C_1$; that is it is returned for use again by the voltage source $V_s$.

Figure 3:
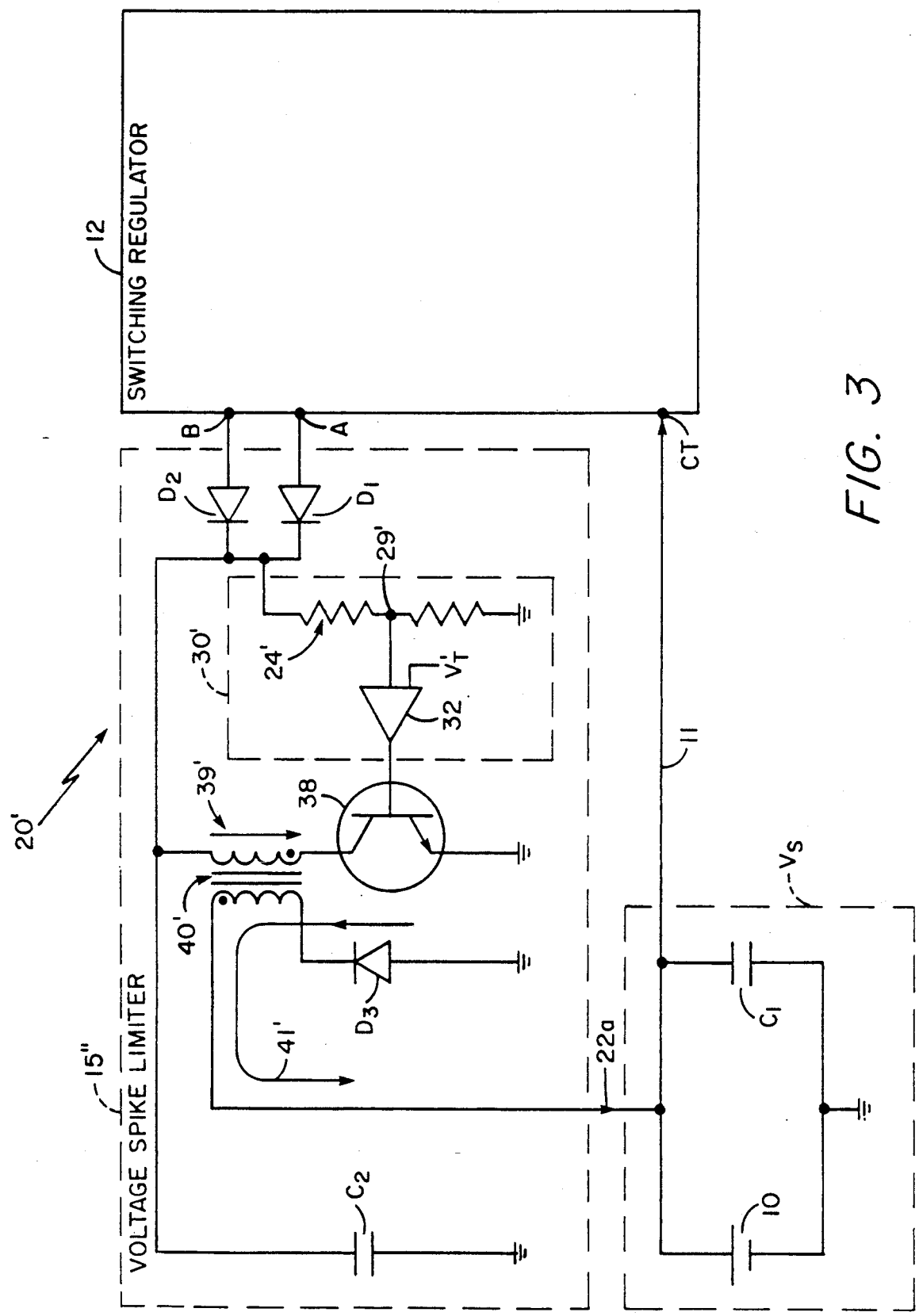
FIG. 3 is a schematic diagram of a DC-DC converter according to an alternate embodiment of the invention.

Referring now to FIG. 3, a DC-DC converter 20' is shown to include the switching regulator 12 and voltage source $V_s$ connected as shown to a voltage spike limiter 15''. Voltage source $V_s$ again includes a battery 10 and parallel connected capacitor C, connected between ground and line 11. Switching regulator 12 is the same as that shown in FIG. 2 and thus line 11 is again connected to the center tap of transformer T (FIG. 2). Limiter 15'' includes diodes $D_1$, $D_2$ connected to lower end A and upper end B as in FIG. 2. The limiter 15'' includes a controller 30' made up of a voltage divider 24' with terminal 29' thereof connected to one input comparator 32', the other input of such comparator 32' being connected to a threshold voltage $V_T'$. The output of comparator 32' is fed to the base of grounded emitter transistor 38. A transformer 40' has its primary connected in series between the collector of transistor 38 and the input of voltage divider 24', as shown, and also to one plate of grounded capacitor $C_2$, as shown. The secondary winding of transformer 40' has its lower end connected to ground through diode $D_3$ and its upper end connected to the voltage source $V_s$ via line 22a. The winding polarities of the primary and secondary are indicated by the dots ( • ), as shown. Here again, in response to a voltage spike $V_{A\ PEAK}$, $V_{B\ PEAK}$, produced at ends A or B, respectively, diodes $D_1$, $D_2$, respectively, become forward biased rapidly charging capacitor $C_2$. The voltage at terminal 29' exceed $V_T$, with the result that comparator 32 drives transistor 38 to a conducting condition. Under such condition, current indicated by arrow 39' passes through the primary of transformer 40' to ground through transistor 38. A voltage is thus induced in the secondary of transformer 40' with a polarity such that diode $D_3$ is back biased to a non-conducting condition. When the voltage on capacitor $C_2$ decays through voltage divider 24', the voltage at terminal 29' decreases. When such voltage decreases below the threshold voltage $V_T$, comparator 32 drives transistor 38 to a non-conducting condition. A back EMF is thus induced in the secondary of transformer 40' with a polarity to forward bias diode $D_3$ so that energy stored in the magnetic field of the secondary of transformer 40' causes a current indicated by arrow 41' to flow providing additional charge to capacitor $C_1$ via line 22a.

Having described the preferred embodiment of the invention, it will now be apparent to one of skill in the art that other embodiments incorporating its concepts may be used. For example, while bipolar transistors have been described, field effect transistors may be used. Further, the capacitor $C_2$ in FIG. 3 may be connected to line 22a instead of to ground. Also, in FIG. 3, instead of connecting the emitter of transistor 38, the voltage divider 24' and the capacitor $C_2$ to ground, they may all be connected to line 22a. Still further, the transistor 38 and primary of transformer 40' in FIG. 3 may be reversed so that the collector of transistor 38 is connected to the output of diodes $D_1$, $D_2$, and the emitter of such transistor 38 is connected to the upper end of the primary winding. It is believed, therefore, that this invention should not be restricted to the disclosed embodiment, but rather should be limited only by the spirit of the scope of the appended claims.

What is claimed is:

1. A switching circuit comprising:
   (a) means for providing a DC voltage;
   (b) a transformer having a pair of inductively coupled, serially connected, primary windings;
   (c) means for electrically coupling the DC voltage means across a first one of the pair of windings during a first portion of a cycle and for inducing a voltage in a second one of the pair of windings during such first portion of the cycle, and for electrically coupling the DC voltage means across the second one of the pair of windings during a second, subsequent portion of the cycle and for inducing a voltage in the first one of the pair of windings during such second portion of the cycle;
   (d) means, responsive to an excess voltage corresponding to a level of the voltage induced in the pair of windings exceeding a predetermined voltage, for directing energy related to said excess voltage back to the DC voltage means, said directing means comprising:
   a capacitor fed by the excess voltage;
   inductive means for storing energy;
   switching means, responsive to a control signal, for electrically coupling the capacitor to the inductive means to transfer energy corresponding to the excess voltage stored in the capacitor to said inductive means, for electrically decoupling the capacitor from the inductive means to the DC voltage means to transfer the energy stored in the inductive means to the DC voltage means; and
   means for controlling the switching means comprising:
   a voltage divider connected in shunt with the capacitor, fed by the excess voltage, to provide a voltage proportional to the excess voltage stored in the capacitor; and
   means, coupled to the voltage divider and fed by a reference voltage, for producing the control signal in response to changes in the excess voltage stored in the capacitor relative to said reference voltage.

2. The circuit recited in claim 1 wherein the directing means further includes a diode serially coupled to the inductive means and the DC voltage means and wherein the means for producing the control signal is a comparator.

3. The circuit recited in claim 2 wherein the transformer has at least one secondary winding magnetically coupled to the pair of inductively coupled primary windings.

4. The circuit recited in claim 3 including rectifying means coupled to the at least one secondary winding of the transformer for producing current having the same direction of flow during the first and second portions of the cycle.

5. The circuit recited in claim 4 including means for producing an output voltage in response to the rectifying means produced current.

6. The circuit recited in claim 5 wherein the coupling means includes:
   a first transistor having a control electrode, a reference electrode, and a signal electrode, coupled in series with the first one of the pair of windings and the DC voltage means;
   a second transistor having a control electrode, a reference electrode, and a signal electrode, coupled in series with the second one of the pair of windings and the DC voltage means; and
   means, responsive to the output voltage, for activating the control electrode of the first transistor while deactivating the control of electrode of the second transistor during the first portion of the cycle and for activating the control electrode of the second transistor while deactivating the control electrode of the first transistor during the second portion of the cycle.

7. The circuit recited in claim 6 wherein the reference electrode and the signal electrode of the first transistor are disposed in series with the first one of the pair of windings and the DC voltage means, and the reference electrode and the signal electrode of the second transistor are disposed in series with the second one of the pair of windings and the DC voltage means.

8. The circuit recited in claim 7 wherein the activating means includes means for regulating the coupling and decoupling of the pair of windings to the DC voltage means at a rate to produce the output voltage having a predetermined average level.

9. The circuit recited in claim 8 wherein the first one of the pair of windings and the second one of the pair of windings each have one end thereof connected together at a common terminal, such common terminal being coupled to a first potential of the DC voltage means and wherein a second potential of the DC voltage means is coupled to the reference electrode of the first transistor and the reference electrode of the second transistor, the signal electrode of the first transistor being coupled to a second end of the first one of the pair of windings and the signal electrode of the second transistor being coupled to a second end of the second one of the pair of windings.

10. The circuit recited in claim 9 wherein a first diode is coupled between the second end of the first one of the pair of windings and the capacitor and a second diode is coupled between the second end of the second one of the pair of windings and the capacitor.

* * * * *

UNITED STATES PATENT AND TRADEMARK OFFICE
CERTIFICATE OF CORRECTION

PATENT NO. : 5,014,176
DATED : May 7, 1991
INVENTOR(S) : John J. Kelleher, Jr., and Donald W. Shute It is certified that error appears in the above-identified patent and that said Letters Patent is hereby corrected as shown below:

Col. 8, line 2 after "means" insert --, and for electrically coupling the inductive means--.

Signed and Sealed this

Sixteenth Day of February, 1993

*Attest:*

STEPHEN G. KUNIN

*Attesting Officer*     *Acting Commissioner of Patents and Trademarks*